(No Model.)

J. F. McLEAN.
CULINARY VESSEL OR APPARATUS.

No. 534,906.                                Patented Feb. 26, 1895.

Witnesses.
Robert Everett
Thos. A. Green

Inventor:
John F. McLean.
By James L. Norris
Atty.

UNITED STATES PATENT OFFICE.

JOHN F. McLEAN, OF SALISBURY, NORTH CAROLINA.

CULINARY VESSEL OR APPARATUS.

SPECIFICATION forming part of Letters Patent No. 534,906, dated February 26, 1895.

Application filed July 23, 1894. Serial No. 518,371. (No model.)

*To all whom it may concern:*

Be it known that I, JOHN F. McLEAN, a citizen of the United States, residing at Salisbury, in the county of Rowan and State of North Carolina, have invented new and useful Improvements in Culinary Vessels or Apparatus, of which the following is a specification.

My invention relates to culinary vessels or apparatus and has for its object to improve the construction and relative arrangement of the parts of a hot air cooking apparatus in such manner that the heated air contained in an outer tightly closed vessel or pot will be caused to completely envelop an inner tightly closed vessel or kettle in which is placed the material to be cooked; the heat being reflected down upon the lid of the inner kettle and confined around or in contact with the whole of the top, bottom and sides of said inner vessel so that all kinds of meats and vegetables will be cooked thoroughly and quickly in the best possible manner, preserving all their nutritious properties and natural flavors to a much greater degree than when subjected to boiling in water. The cooking will be accomplished, by means of this apparatus, with a saving of at least one half of the fuel usually required and without loss of substance or weight in the articles cooked.

The invention consists in the features of construction and novel combinations of parts in a hot air culinary vessel or apparatus as hereinafter described and claimed.

Figure 1:
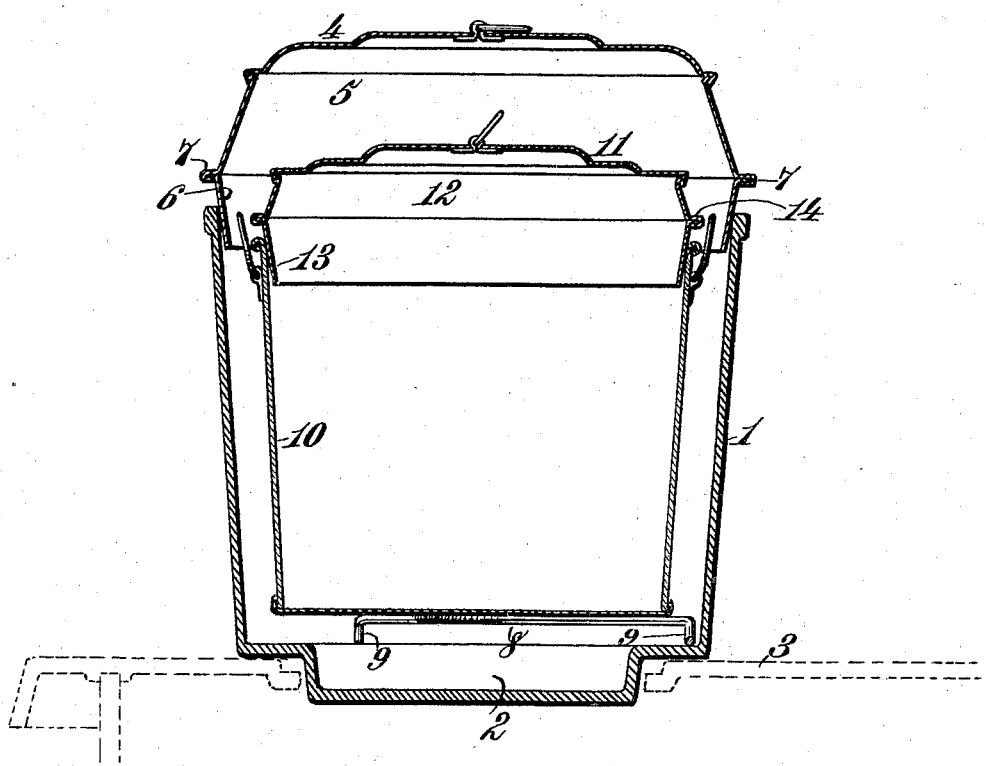
Figure 2:
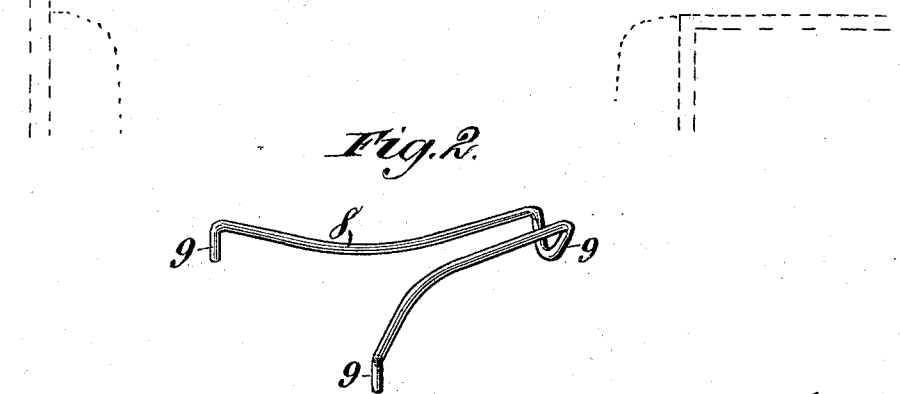

In the annexed drawings illustrating the invention—Figure 1 is a central vertical longitudinal section of my improved culinary apparatus in position upon the top of a stove or range. Fig. 2 is a perspective of a removable grid or frame for supporting the inner vessel or kettle away from direct contact with the bottom of the outer vessel or pot and in such manner as to permit a circulation of heat in the space between the two vessels.

Referring to Fig. 1, the numeral 1 designates a pot or vessel preferably composed of iron, brass, copper or other metal. To facilitate placing this pot on a hole or opening in the top of a stove or range and to increase the heating surface the said pot or vessel has its bottom preferably formed with a well or sunken portion 2 of a size to readily enter the opening in the stove or range top 3, as shown.

The pot or vessel 1 is preferably of larger diameter at top than at bottom, its sides being tapered, as shown, from top to bottom, thus facilitating an expansion of heated air toward the top of the vessel. This pot 1 is closed and tightly sealed by means of a top or cover 4 so constructed as to constitute a hot air chamber at the top portion of the pot and afford a largely extended reflecting surface for causing the ascending hot air to be deflected downward onto the closed top of an inner vessel or kettle in which are placed the articles to be cooked.

The pot lid 4 is constructed with a dome portion or top 5 and a somewhat tapering annular flange 6 adapted to fit tightly into the top of the pot. At the junction of the dome 5 and annular flange 6 is a bead 7 located on the outside of the lid and adapted to come in contact with the top rim of the pot when the lid is forced all the way down. Ordinarily, however, the lid 4 need not be forced down so far as to bring the bead 7 into contact with the pot rim.

The annular flange 6 of the lid or cover 4 is made quite deep and of a taper slightly greater than that of the pot so that it will fit tightly therein and seal the pot closely without at first being forced all the way down. This construction provides for maintaining a tight fit of the pot lid even after long use. The pot lid 4 is without any openings or perforations whatever and as it is arranged to at all times fit closely within the top of the pot or vessel 1 it is obvious that it will effectually confine the heated air within said vessel during the operation of cooking.

In the bottom of the pot or vessel 1 is placed a grid or frame 8 preferably constructed of a single piece of stout metal wire bent into such shape as to provide feet or toes 9 at diverging points whereby the said grid or frame will bridge the well 2 in the bottom of the pot 1 and afford an elevated support for the inner vessel or kettle 10 that is placed in the outer vessel or pot. By means of this grid or frame 8, bridging the sunken well in the bottom of the pot, the inner vessel or kettle 10 will be wholly supported away from the bottom of the pot, thus affording on all sides a free passage for ascent of hot air to surround the closed inner vessel. As the grid 8 is removable it will not interfere with a separate use of the several parts of the culinary apparatus, if desired.

The inner vessel or kettle 10 is preferably constructed from sheet metal but may be made of any other suitable material. This inner kettle or vessel 10 may have slightly tapering sides and is provided with a tightly fitting lid or cover 11 comprising a dome 12 and a deep annular flange 13 which will fit closely into the top of the vessel 10 without being forced down sufficiently far to bring its bead 14 into contact with the rim of the vessel. The construction of the tight fitting lids 4 and 11 for the outer and inner vessels, respectively, is substantially the same; both lids being provided with a tapering annular flange to fit tightly within the tapering walls of the respective vessels and each lid having an upwardly bulging domed portion that is tapered reversely to the taper of the lid flange. Each lid is also formed on the outside with an annular bead that will fit onto the rim of the vessel when the lid is forced all the way down. The tapered lid flanges are however, so proportioned to the walls of the vessels in which they are to engage that they will make a tight fitting closure without being forced entirely down and thus a close fitting of the lid is provided even after long use of the apparatus. Each vessel 4 and 10 may be provided with suitable bails or handles and each lid or cover may have on its outside a ring or knob for lifting it.

In using this apparatus the meats or vegetables to be cooked are placed in the inner vessel or kettle 10, and if it is desired to cook them in their own juices no water, or but very little, will be required. The lid 11 of the inner vessel is then placed in position to tightly close and seal said vessel and the latter is then lowered into the outer pot or vessel 1, resting therein on the supporting grid or frame 8 in the bottom of said outer vessel. The lid 4 of the outer vessel or pot is now attached and forced down sufficiently to tightly close and seal the interior and the apparatus is placed on the fire. It will be observed that there is no water in the outer pot or vessel 4 it being the purpose of my invention to accomplish the cooking by means of heated air, and without boiling or steaming. The heated air in the tight closed pot or vessel 1 completely surrounds the inner tightly closed kettle or vessel 10 and rises above the same into the dome shaped cover 4 the largely extended surface of which serves to reflect the heat downward onto the top of the inner vessel or kettle in which the food is contained. The edible materials placed in the inner vessel or kettle 10 are thus subjected to a uniform heat, without being in direct contact with the outer vessel and the food is thus quickly and thoroughly cooked in its own juices, without loss of weight or substance and with perfect preservation of its nutritious properties and natural flavors. This mode of cooking is applicable to both meats and vegetables, of nearly every kind and will render the food palatable and digestible, requires less than the ordinary seasoning and preserves the natural aroma and flavor to a greater extent than when cooking is done in vessels that are open to the atmosphere or when the ordinary boiling, baking or steaming operations are practiced.

An apparatus of this construction, in which the vessel containing the food is tightly closed and entirely surrounded by a confined body of heated air, will also effect a large economy of fuel. The grid 8 removably placed in the bottom of the outer pot 1 affords a convenient means for supporting the inner vessel in such manner that it will be out of contact with the outer vessel and permit a free passage of heated air below as well as around and above the inner vessel without any liability of scorching or burning its contents. It will also be observed that the construction of the apparatus is such that the inner and outer vessels may be readily and conveniently utilized independently of each other whenever required.

What I claim as my invention is—

In a hot-air culinary apparatus, the combination with a pot having a closed and sunken bottom for direct exposure to products of combustion, and an imperforate and tightly fitting dome-shaped cover to confine heated air within said pot, and a grid bridging the sunken bottom of the pot of a tightly closed inner cooking vessel or kettle removably supported on the grid in the said pot or outer vessel, away from the bottom, sides and cover of the outer vessel, and adapted to be wholly surrounded at bottom, top and sides by a confined body of heated air in said outer vessel, whereby the heat will circulate around the closed inner vessel and be reflected down thereon from the extended inner surface of the tightly closing dome-shaped cover of the outer vessel, substantially as shown and described.

In testimony whereof I have hereunto set my hand and affixed my seal in presence of two subscribing witnesses.

JOHN F. McLEAN. [L. S.]

Witnesses:
 THOS. A. GREEN,
 JAMES L. NORRIS.